(12) United States Patent
Jung et al.

(10) Patent No.: US 9,137,306 B2
(45) Date of Patent: Sep. 15, 2015

(54) METHOD AND APPARATUS FOR WI-FI CONNECTION USING WI-FI PROTECTED SETUP IN PORTABLE TERMINAL

(71) Applicant: Samsung Electronics Co. Ltd., Suwon-si, Gyeonggi-do (KR)

(72) Inventors: Bu-Seop Jung, Suwon-si (KR); Jung-Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 13/660,439

(22) Filed: Oct. 25, 2012

(65) Prior Publication Data
US 2013/0100855 A1    Apr. 25, 2013

(30) Foreign Application Priority Data

Oct. 25, 2011    (KR) .................. 10-2011-0109277

(51) Int. Cl.
*G06F 21/62*    (2013.01)
*H04L 29/08*    (2006.01)
*H04W 12/06*    (2009.01)
*H04W 8/00*    (2009.01)
*H04W 84/12*    (2009.01)

(52) U.S. Cl.
CPC ........... *H04L 67/1044* (2013.01); *H04W 12/06* (2013.01); *H04W 8/005* (2013.01); *H04W 84/12* (2013.01)

(58) Field of Classification Search
CPC ..... H04W 12/06; H04W 84/12; H04W 8/005; H04W 76/023; H04W 4/08; H04L 67/1044
USPC .......... 709/208, 221–222, 225–229; 713/100, 713/153–157, 168–170, 182–185; 726/3–4, 726/7
See application file for complete search history.

(56) References Cited

U.S. PATENT DOCUMENTS

| | | | |
|---|---|---|---|
| 2008/0177822 A1* | 7/2008 | Yoneda ..................... | 709/202 |
| 2010/0291954 A1* | 11/2010 | Nakajima .................. | 455/507 |
| 2011/0222518 A1* | 9/2011 | Ota et al. .................. | 370/338 |
| 2011/0230139 A1* | 9/2011 | Nakahara .................. | 455/41.2 |

(Continued)

OTHER PUBLICATIONS

What is Wi-Fi?—An IT Definition From Webopedia.com, Sep. 25, 2012, https://web.archive.org/web/20110810013514/http://www.webopedia.com/TERM/W/Wi_Fi.html, p. 1.*

(Continued)

*Primary Examiner* — Joseph P Hirl
*Assistant Examiner* — Stephen Gundry
(74) *Attorney, Agent, or Firm* — Jefferson IP Law, LLP

(57) ABSTRACT

A method and an apparatus for Wi-Fi connection based on Wi-Fi Protected Setup (WPS) in a portable terminal are provided. The method includes entering a group owner mode of Wi-Fi Direct when enabling of WPS is requested, after entering the group owner mode, entering a WPS session mode where the portable terminal is operable in a WPS registrar mode, determining whether an Access Point (AP) whose WPS session of the WPS registrar mode is enabled or a device whose group owner mode is enabled, exists nearby, and when an AP whose WPS registrar mode is enabled is discovered, disabling the WPS registrar mode and the group owner mode, enabling a WPS session where the portable terminal is to operate in a WPS enrollee mode, and accessing the discovered AP.

10 Claims, 2 Drawing Sheets

(56) References Cited

U.S. PATENT DOCUMENTS

2012/0102207 A1* 4/2012 Salowey et al. ............... 709/228
2012/0265913 A1* 10/2012 Suumaki et al. .............. 710/303
2012/0322368 A1* 12/2012 Desai et al. .................. 455/41.1
2013/0227152 A1* 8/2013 Lee et al. ...................... 709/227
2014/0314059 A1* 10/2014 Yoon et al. .................... 370/338

OTHER PUBLICATIONS

Wi-Fi Simple Configuration, Feb. 9, 2010, Published by the Wi-Fi Alliance, Version 2.0 r42 unofficial draft-01, p. 1.*
Wi-Fi Peer-to-Peer (P2P) Technical Specification, 2010, Published by the Wi-Fi Alliance, Version 1.1, p. 1.*

* cited by examiner

METHOD AND APPARATUS FOR WI-FI CONNECTION USING WI-FI PROTECTED SETUP IN PORTABLE TERMINAL

PRIORITY

This application claims the benefit under 35 U.S.C. §119 (a) of a Korean patent application filed in the Korean Intellectual Property Office on Oct. 25, 2011 and assigned Serial No. 10-2011-0109277, the entire disclosure of which is hereby incorporated by reference.

BACKGROUND OF THE INVENTION

1. Field of the Invention

The present invention relates to wireless communication. More particularly, the present invention relates to a method and an apparatus for allowing an easy connection among devices supporting Wireless-Fidelity (Wi-Fi) communication using Wi-Fi Protected Setup (WPS).

2. Description of the Related Art

Wireless communication of the related art with Wi-Fi connection is mainly aimed to allow Wi-Fi-enabled devices to wirelessly perform communication through Access Points (APs), thus lacking the consideration of direct communication among Wi-Fi-enabled devices.

Taking into account that legacy Wi-Fi does not smoothly support direct communication among devices, the Wi-Fi Alliance has proposed a new feature called Wi-Fi Direct or Wi-Fi Peer to Peer (P2P).

Wireless-Fidelity (Wi-Fi) Direct is compatible with legacy Wi-Fi, and provides a function (e.g., P2P communication function) for allowing Wi-Fi devices to directly access each other for communication even without APs.

Because Wi-Fi Direct has been proposed taking into account the compatibility with Wi-Fi of the related art (i.e., legacy Wi-Fi), legacy Wi-Fi devices basically support WPS connection.

WPS connection allows devices attempting Wi-Fi connection to easily achieve Wi-Fi wireless communication through a button input by a Push Button Configuration (PBC) scheme or a Personal Identification Number (PIN) information input by a PIN scheme.

If a WPS session is enabled, a device attempting Wi-Fi connection determines the presence of APs through frequency and channel scanning, starts a WPS registration protocol with an AP whose WPS session is enabled, among the discovered APs, acquires credentials (e.g., Service Set IDentifier (SSID), Security Info, Network Key, and the like) of the AP, and automatically accesses the AP using the acquired credentials.

Advantageously, this WPS connection allows users to conveniently enjoy Wi-Fi wireless communication. Thus, supporting WPS connection not only for legacy Wi-Fi but also for Wi-Fi Direct may increase the convenience of using Wi-Fi Direct.

However, Wi-Fi Direct may support only devices complying with the Institute of Electrical and Electronics Engineers (IEEE) 802.11g standard or more (e.g., IEEE 802.11g or IEEE 802.11n). Hence, devices supporting only legacy Wi-Fi (e.g., devices complying with only IEEE 802.11b) may not support Wi-Fi Direct.

In this way, not all Wi-Fi devices may support Wi-Fi Direct. Thus, in order to support connection with WPS buttons even for Wi-Fi Direct connection, a WPS button for legacy Wi-Fi connection and a WPS button for Wi-Fi Direct connection need to be provided separately.

However, if WPS buttons for use of a legacy Wi-Fi function (e.g., wireless communication through AP access) and a Wi-Fi Direct function (e.g., P2P communication among Wi-Fi devices) are provided separately, the original intent to use the legacy Wi-Fi function or the Wi-Fi Direct function through a simple procedure may not be met. In addition, it may be convenient for users to use a sort of integrated Wi-Fi function, in which the users may select any one of legacy Wi-Fi connection and Wi-Fi Direct connection depending on the characteristics of the device corresponding to a connection target, by simply selecting one WPS button.

Therefore, a need exists for a WPS connection scheme capable of supporting both legacy Wi-Fi connection and Wi-Fi Direct connection by simply enabling WPS connection regardless of the Wi-Fi support standard and the properties of a Wi-Fi device.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for applying a Wi-Fi Protected Setup (WPS) connection scheme, which was applied only to legacy Wi-Fi connection, even to Wi-Fi Direct connection, and allowing any selected one of legacy Wi-Fi and Wi-Fi Direct to be automatically connected depending on a type of a device corresponding to a connection target only with one WPS connection request menu (e.g., a WPS button of a Push Button Configuration (PBC) connection). In other words, an aspect of the present invention is to provide a WPS connection scheme capable of supporting both legacy Wi-Fi connection and Wi-Fi Direct connection by simply enabling WPS connection regardless of the Wi-Fi support standard and the properties of a Wi-Fi device.

In accordance with one aspect of the present invention, a method for Wi-Fi connection based on WPS in a portable terminal is provided. The method includes entering a group owner mode of Wi-Fi Direct when enabling of WPS is requested, after entering the group owner mode, entering a WPS session mode where the portable terminal is operable in a WPS registrar mode, determining whether an Access Point (AP) whose WPS session of the WPS registrar mode is enabled or a device whose group owner mode is enabled, exists nearby, and when an AP whose WPS registrar mode is enabled or a device whose group owner mode is enabled is discovered, disabling the WPS registrar mode and the group owner mode, enabling a WPS session where the portable terminal is to operate in a WPS enrollee mode, and accessing the discovered AP.

In accordance with another aspect of the present invention, an apparatus for Wi-Fi connection based on WPS in a portable terminal is provided. The apparatus includes a Wi-Fi module for providing a short-range wireless communication function based on an Institute of Electrical and Electronics Engineers (IEEE) 802.11 standard, a key input unit or a display unit for receiving a key input from a user, and a controller for entering a group owner mode of Wi-Fi Direct when enabling of WPS is requested on the key input unit or the display unit, entering a WPS session mode where the portable terminal is operable in a WPS registrar mode, determining whether an AP whose WPS session of the WPS registrar mode is enabled or a device whose group owner mode is enabled, exists nearby, and when an AP whose WPS registrar mode is enabled or a device whose group owner mode is enabled is discovered, disabling the WPS registrar mode and the group owner mode, enabling a WPS session where the portable terminal is to operate in a WPS enrollee mode, and accessing the discovered AP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
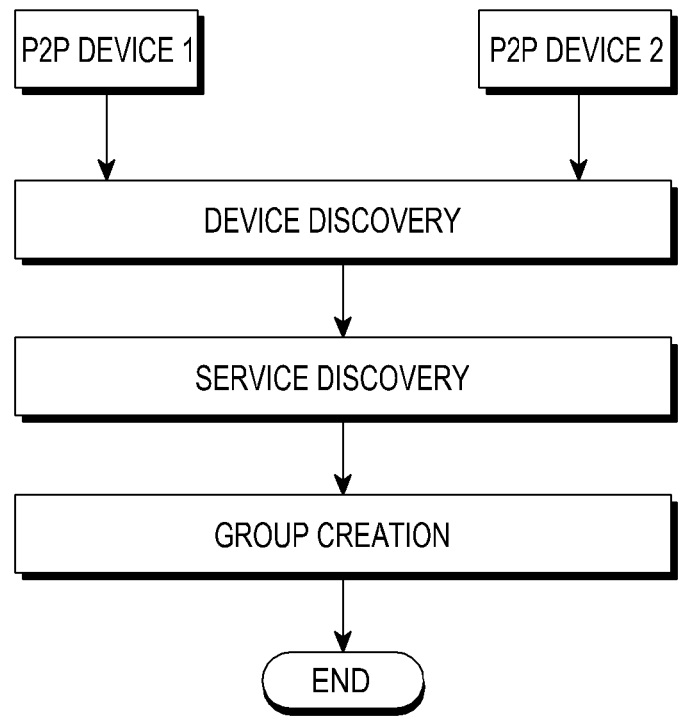
FIG. 1 is a flowchart schematically illustrating a process of creating a Peer to Peer (P2P) group by executing a Wi-Fi P2P function according to an exemplary embodiment of the present invention.
Figure 2:
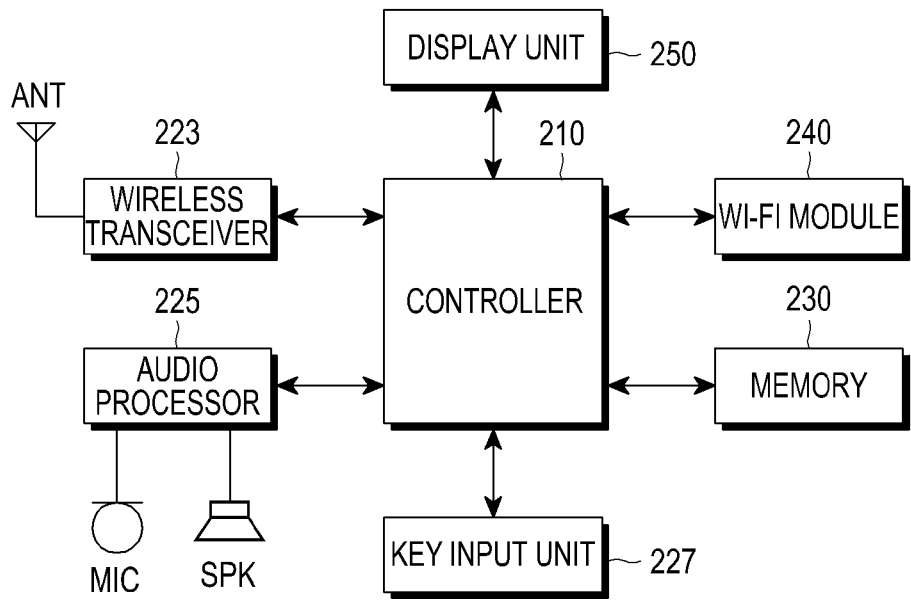
FIG. 2 is a block diagram of a portable terminal according to an exemplary embodiment of the present invention, in which the portable terminal functions as a Wi-Fi device.
Figure 3:
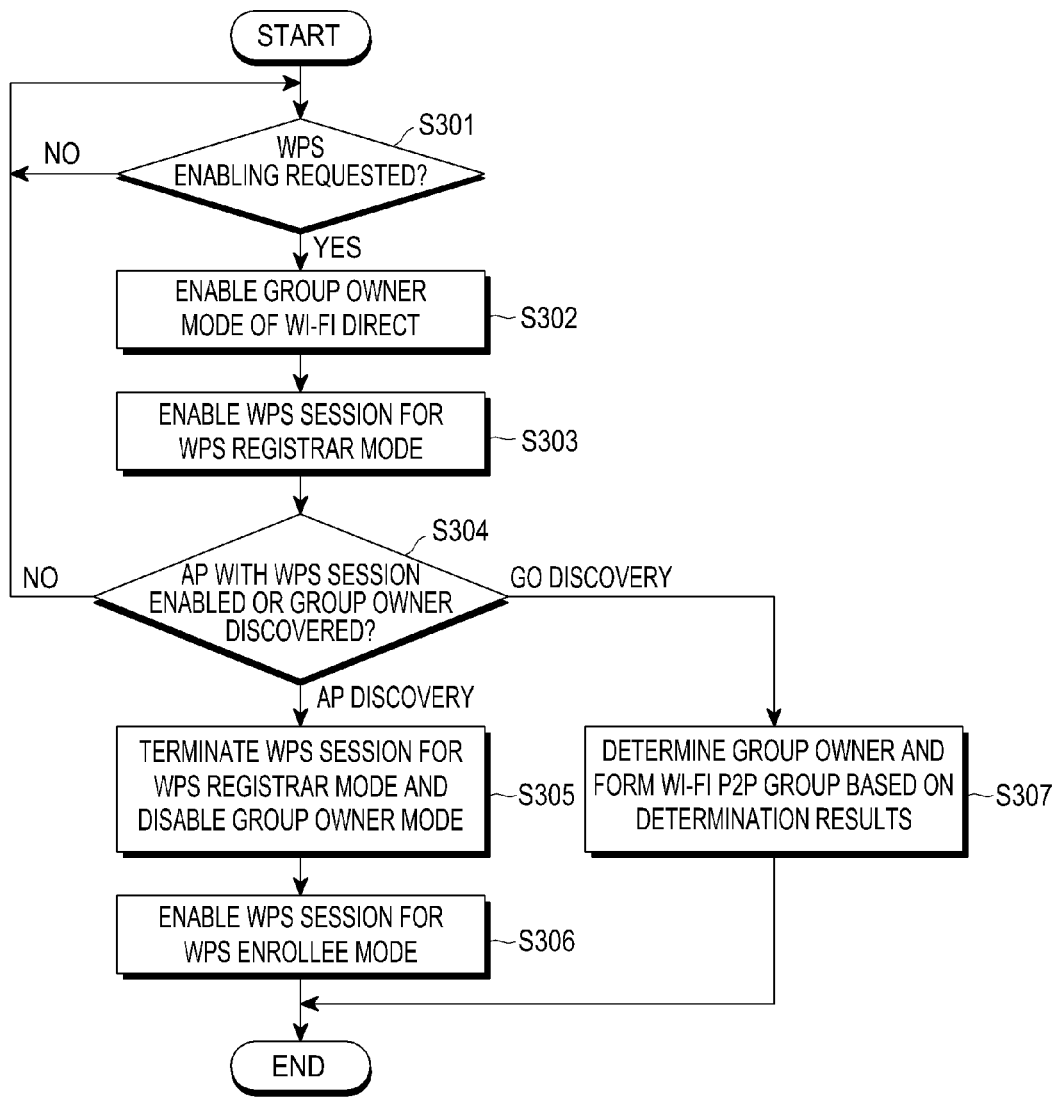
FIG. 3 is a flowchart illustrating a process of connecting Wi-Fi upon Wi-Fi Protected Setup (WPS) enabling request according to an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flowchart schematically illustrating a process of creating a Peer to Peer (P2P) group by executing a Wi-Fi P2P function according to an exemplary embodiment of the present invention.

Referring to FIG. 1, devices (e.g., a Peer to Peer (P2P) device 1 and a P2P device 2) supporting Wi-Fi Direct may create a Wi-Fi P2P group.

Prior to a description of an exemplary embodiment of the present invention for supporting both legacy Wi-Fi connection and Wi-Fi Direction connection through Wi-Fi Protected Setup (WPS) connection, a process of creating a Wi-Fi P2P group based on Wi-Fi Direct will be described below. Creation (or formation) of a Wi-Fi P2P group may be achieved through three processes: Device Discovery, Service Discovery, and Group Creation. These processes will be described in order below.

Device Discovery

A device discovery process is a procedure needed when Wi-Fi devices (e.g., P2P devices 1 and 2) identify each other and configure a connection to create a Wi-Fi P2P group based on Wi-Fi Direct.

A Wi-Fi P2P device (e.g., a P2P device 1 or a P2P device 2 shown in FIG. 1), which has entered a menu where it desires to use a Wi-Fi Direct function (or a Wi-Fi P2P function) or has entered a device discovery mode as a predefined application runs, discovers its surrounding Wi-Fi devices by repeating channel scan, listen, and search functions of the Institute of Electrical and Electronics Engineers (IEEE) 802.11 standard at stated periods of time.

The basic operation of the device discovery procedure performed in a process of creating a Wi-Fi P2P group is performed by exchanging Probe Request and Probe Response messages of an IEEE 802.11 Medium Access Control (MAC) protocol. Probe Request includes information, such as P2P Information Element (IE), Wi-Fi Simple Configuration (WSC) IE and Supplemental Registration (Supp Reg) IE, and Probe Response includes information, such as P2P IE, WSC IE, Robust Security Network (RSN) IE and Supp Reg IE.

Service Discovery

Service discovery may be optionally performed between the above-described device discovery process and a group creation process described below. The service discovery process is performed to provide a function in which each Wi-Fi device supporting Wi-Fi Direct exchanges information about its supportable services by identifying supportable service protocols and services through an exchange of request and response messages.

For example, assuming that the P2P device 1 is a camera and the P2P device 2 is a printer, if a user of the P2P device 1 wants to print out a photo, the P2P device 1 may determine whether a photo output function of the P2P device 2 is available, through service discovery, because it needs to determine whether the P2P device 2 supports a photo output function.

Group Creation

To create a Wi-Fi P2P group of Wi-Fi Direct, Wi-Fi devices (e.g., P2P device 1 and P2P device 2) perform Provision Discovery, which is one of the important features defined in Wi-Fi Direct standard.

To use a Wi-Fi Direct function, the P2P devices basically operate based on WSC, e.g., operate based on WPS. WSC support of connection devices was optional in the Wi-Fi standard of the related art, but it is mandatory in the Wi-Fi Direct standard.

WPS, one of some WSC standards, is classified into a Push Button Configuration (PBC) scheme where a button should be pushed and a Personal Identification Number (PIN) scheme where a PIN number should be input. Inconveniently, for both the PBC scheme and the PIN scheme, their settings should be completed within 120 seconds. For example, in the case of the PBC scheme, a WSC registration protocol starts only when a WPS button is input in another device within 120 seconds after a wireless connection was requested in one device by the PBC scheme, and the devices exchange a Service Set Identifier (SSID) and credential (which is the sum of cryptographic information and includes information, such as Authentication type, encryption type, network key, SSID, and the like) needed for connection.

The standard newly defined in Wi-Fi Direct to relieve these inconveniences of the WSC of the related art (or WPS) is Provision Discovery, in which when a predefined Wi-Fi P2P device (e.g., P2P device 1) attempts a connection by the WSC of the related art (i.e., a PBC scheme or a PIN scheme) after discovering another Wi-Fi P2P device (e.g., P2P device 2), it informs another Wi-Fi P2P device's user of its connection attempt by sending a WSC Method message. The WSC Method message is classified into different types: a PBC, a PIN from a display unit, and a PIN from a keypad. The PBC may notify another Wi-Fi P2P device's user of a request for Wi-Fi Direct connection when another Wi-Fi P2P device's user receives a button input, and a PIN from a display unit and a PIN from a keypad may notify another Wi-Fi P2P device's user of a request for Wi-Fi Direct connection by an event where a PIN number is displayed or input on another Wi-Fi P2P device.

If Provision Discovery is completed as users of the P2P device 1 and the P2P device 2 accept the Wi-Fi Direct connection, a Group Owner Negotiation process is performed between the Wi-Fi devices. Since Wi-Fi Direct needs to determine (or set) a Group Owner (GO) that will play a central role in a created Wi-Fi P2P group, a Group Owner Negotiation process of determining a Wi-Fi device that will serve as GO is needed for use of the Wi-Fi P2P function. The Group Owner Negotiation process is performed by exchange of GO Negotiation Request, GO Negotiation Response, and GO Negotiation Confirm frames. GO Negotiation Request and GO Negotiation Response include P2P IE information and WSC IE information, respectively. A field of P2P IE includes information, such as P2P Capability, P2P Device Info, Group Owner Intent, Configuration Timeout, Listen Channel, Extended Listen Timing, Intended P2P Interface Address, Channel List, and Operating Channel attributes. A field of WSC-IE includes information, such as DEVICE PASSWORD ID, MANUFACTURER, MODEL NAME, MODEL NUMBER, SERIAL NUMBER, and DEVICE NAME.

The P2P device 1 and the P2P device 2 compare Group Owner Intent included in P2P IE. A device with greater Group Owner Intent is determined as GO, while a device with less Group Owner Intent is determined as a Group Client (GC). If the P2P device 1 and the P2P device 2 are determined as GO and GC, respectively, the Group Owner Negotiation process is completed. If Provisioning, in which the device set as GO operates as a WSC registrar and the device set as GC operates as a WSC enrollee and they exchange credentials with each other, is completed, the group setup process for forming a Wi-Fi P2P group is completed.

Thereafter, if the group forming process is completed, the GO device shifts to an operating channel and starts its role as GO, and the GC device accesses GO based on the credentials identified through Provisioning. Finally, the two devices are connected to the Wi-Fi P2P group.

FIG. 2 is a block diagram of a portable terminal according to an exemplary embodiment of the present invention, in which the portable terminal functions as a Wi-Fi device.

In an exemplary embodiment of the present invention, a portable terminal is a mobile electronic device that a user may easily carry with him or her, and may include video phones, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Book terminals, portable computers (e.g., notebook computers, tablet computers, and the like), and digital cameras.

Referring to FIG. 2, a wireless transceiver 223 includes a Radio Frequency (RF) unit and a modulator/demodulator (modem). The RF unit includes an RF transmitter for up-converting a frequency of transmission signals and amplifying the up-converted signals, and an RF receiver for low-noise-amplifying received signals and down-converting a frequency of the amplified signals. The modem includes a transmitter for coding and modulating transmission signals, and a receiver for demodulating and decoding signals received from the RF unit.

An audio processor 225 may include a coder/decoder (codec), and the codec includes a data codec and an audio codec. The data codec processes data signals, such as packet data, while the audio codec processes audio signals, such as voice and multimedia files. The audio processor 225 converts digital audio signals received from the modem into analog audio signals by means of the audio codec, and plays the analog audio signals using a speaker SPK. The audio processor 225 converts analog audio signals picked up by a microphone MIC into digital audio signals by means of the audio codec, and transfers the digital audio signals to the modem. The codec may be provided separately, or may be included in a controller 210.

A key input unit 227 may include alphanumeric keys needed to input alphanumeric information and function keys needed to set various functions, or may include a touchpad or the like. When a display unit 250 has a capacitive or resistive touch screen, the key input unit 227 may include a minimum number of predefined keys, and the display unit 250 may replace part of the key input function of the key input unit 227.

A memory 230 may include a program memory and a data memory. The program memory stores programs for controlling the overall operation of the portable terminal. The memory 230 may further include an external memory, such as Compact Flash (CF), Secure Digital (SD), Micro Secure Digital (Micro-SD), Mini Secure Digital (Mini-SD), Extreme Digital (xD), and Memory Stick. In addition, the memory 230 may include a disk, such as a Hard Disk Drive (HDD) and a Solid State Disk (SSD).

A Wi-Fi module 240 provides a short-range wireless communication function based on the IEEE 802.11 standard. In accordance with an exemplary embodiment of the present invention, the Wi-Fi module 240 meets Wi-Fi Direct standard, and thus may provide a function in which portable terminals in a Wi-Fi P2P group formed by Wi-Fi Direct may exchange data with each other. The Wi-Fi module 240 may also provide the legacy Wi-Fi function (e.g., a function of performing wireless communication by accessing an Access Point (AP)) because it meets the Wi-Fi Direct standard.

The display unit 250 may include a Liquid Crystal Display (LCD) or an Organic Light Emitting Diode (OLED), which is classified into Passive Matrix OLED and Active Matrix OLED, and outputs various display information generated in the portable terminal. The display unit 250 includes a capacitive or resistive touch screen and may serve as an input unit for controlling the portable terminal, together with the key input unit 227.

The controller 210 may control the overall operation of the portable terminal based on a user input received through the key input unit 227 and/or the display unit 250. In accordance with an exemplary embodiment of the present invention, the controller 210 may perform a series of corresponding operations associated with a process of entering a group owner mode of Wi-Fi Direct if enabling of WPS is requested, a process of entering a WPS session mode where the portable terminal is operable in a WPS registrar mode, after entering the group owner mode, determining whether an AP whose WPS session of the WPS registrar mode is enabled or a device whose group owner mode is enabled, exists nearby, and a process of, if an AP whose WPS registrar mode is enabled is discovered, disabling the WPS registrar mode and the group owner mode, enabling a WPS session where the portable terminal is to operate in a WPS enrollee mode, and accessing the discovered AP.

FIG. 3 is a flowchart illustrating a process of connecting Wi-Fi upon WPS enabling request according to an exemplary embodiment of the present invention.

Referring to FIG. 3, in steps S301 through S303, if it is determined that enabling of WPS is requested, the controller 210 enters a Group Owner mode of Wi-Fi Direct, and enters a WPS session mode where it can operate in a WPS registrar mode.

In an exemplary embodiment of the present invention, Wi-Fi connection is classified into legacy Wi-Fi for performing wireless communication through an access to AP, and Wi-Fi Direct capable of forming a Wi-Fi P2P group with another Wi-Fi device.

If it is determined that a user has requested enabling of WPS by a WPS PBC button or a WPS PIN input through a key input on the key input unit 227 or the display unit 250, the controller 210 enables GO mode of Wi-Fi Direct and acquires GO rights. After acquiring GO rights, the controller 210 enables a WPS session so that the portable terminal may operate in a WPS registrar mode during Wi-Fi connection.

For example, by entering a WPS session mode where it may operate in a WPS registrar mode, the controller 210 performs a process for providing various communication parameters (e.g., an SSID (or network identifier), a frequency channel, an authentication type, an encryption type, a network key, etc.) defined by the IEEE 802.11 standard, to another device.

In steps S304 through S306, the controller 210 determines whether an AP whose WPS session of the WPS registrar mode is enabled or a device (e.g., a portable terminal) whose group owner mode is enabled, exists nearby. If an AP whose WPS registrar mode is enabled is discovered, the controller 210 terminates the WPS session where it operates in the WPS registrar mode, disables the GO mode, and enables the WPS session where it operates in a WPS enrollee mode.

In step S304, the controller 210 may discover an AP (e.g., a Wi-Fi device serving as an AP) whose WPS session of the WPS registrar mode is enabled, by determining various communication parameters (e.g., an SSID (or a network identifier), a frequency channel, an authentication type, an encryption type, an encryption key, etc.) defined by the IEEE 802.11 standard by discovering Wi-Fi-enabled devices using the channel scan method (e.g., IEEE 802.11 scan mode) defined in the IEEE 802.11 standard.

In addition, in step S304, the controller 210 may determine a device having GO rights (or a device whose GO mode is enabled) through exchange of the Probe Request and Probe Response messages of Wi-Fi Direct, described in conjunction with FIG. 1. This is because as described below, a discovered device may have a characteristic prefix in SSID when it has GO rights.

If it is determined in step S304 that an AP, whose WPS session of the WPS registrar mode is enabled, has been discovered, the controller 210 disables the WPS session and GO mode which were enabled in steps S302 and S303. Thereafter, in steps S305 and S306, the controller 210 enables a WPS session where a Wi-Fi device (e.g., a portable terminal) operates in a WPS enrollee mode, and controls the Wi-Fi device to access the discovered AP (e.g., an AP whose WPS session of the WPS registrar mode is enabled). In other words, in steps S305 and S306, the controller 210 provides the legacy Wi-Fi function for accessing an AP and providing wireless communication.

As described in steps S304 through S306, an exemplary embodiment of the present invention may provide a method and an apparatus capable of connecting both legacy Wi-Fi and Wi-Fi Direct using the WPS connection method, and may also provide the compatibility with the legacy Wi-Fi that supports only AP access with the WPS connection method.

If it is determined in step S304 that a device having GO rights (e.g., a device whose GO mode is enabled) has been discovered, the controller 210 determines GO of Wi-Fi Direct and forms a Wi-Fi P2P group according to the determination results, in step S307.

An exemplary embodiment of the present invention is to utilize the WPS connection method (e.g., a PBC scheme), which was applied only during use of legacy Wi-Fi, even during use of Wi-Fi Direct. Accordingly, if WPS connection is requested, the controller 210 automatically enables the GO mode of Wi-Fi Direct in step S302. If an AP is discovered in step S304, the controller 210 provides a legacy Wi-Fi function with WPS connection, and if GO is discovered in step S304, the controller 210 provides a Wi-Fi Direct function.

Therefore, if it is determined in step S304 that a device having GO rights is discovered, a GO selection process for determining which device of the proposed portable terminal and the discovered device (having GO rights) will operate as GO should be performed.

In the exemplary GO setting process described in conjunction with FIG. 1, GO is determined by comparing intent values of Wi-Fi devices. However, the portable terminal has already had GO rights in step S302, and the GO device discovered in step S304 literally has GO rights. Therefore, in step S307, GO needs to be reset between two GO devices.

Wi-Fi Direct standard provides that an SSID name of the Wi-Fi device should have a prefix of Direct-xy so that an AP during operation of GO may be distinguished from an AP during use of legacy Wi-Fi.

Therefore, in step S307, the controller 210 compares Direct-xy which is a prefix attached in front of an SSID name and uses it in determining GO. The controller 210 determines GO by comparing 'xy' values because the two letters 'xy' in the prefix Direct-xy have variable values.

For example, assuming that the proposed portable terminal has an SSID name called direct-10 by acquiring GO rights in step S302 and the device discovered in step S304 to have GO rights has an SSID name called direct-09, the controller 210 may set GO by comparing the value '10' with the value '09'. For example, if it is provided that a device with a greater 'xy' value is set to have GO rights, the portable terminal having the value '10' acquires GO rights, while the discovered device having the value '09' acquires GC rights. Although it is assumed herein that the device with a greater prefix has GO rights, it will be understood by those of ordinary skill in the art that a device with a lesser prefix may have GO rights by a modification of an exemplary embodiment of the present invention.

If GO is determined by the comparison of prefixes, a Wi-Fi P2P group of Wi-Fi Direct is formed according thereto. For example, if the portable terminal acquires GO rights, the controller 210 maintains the WPS session so that the portable terminal may operate as a registrar, and the device that is discovered in step S304 to have GO rights is reset to have GC rights and operates as an enrollee.

In other words, the portable terminal has GO rights, and the device, which was discovered in step S304 to have GO rights, has GC rights. Thus, they form a Wi-Fi P2P group by exchanging credentials with each other.

As is apparent from the foregoing description, despite the common use of Wi-Fi Direct, there are still many devices (e.g., smart phones) supporting only legacy Wi-Fi. A device supporting the Wi-Fi Direct function may connect with a device not supporting the Wi-Fi Direct function with the WPS connection, contributing to the improvement of the compatibility between the devices.

In addition, by enabling the use of the Wi-Fi Direct function with the WPS connection, exemplary embodiments of the present invention may ensure compatibility with the WPS connection for legacy Wi-Fi.

The Wi-Fi Direct connection function provided simply by enabling WPS may reduce the connection time, compared to the Wi-Fi Direct connection method of the related art of making a Wi-Fi Direct connection to the device corresponding to the connection target through the device discovery, service discovery and group creation processes.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for connecting a Wireless-Fidelity (Wi-Fi) using a Wi-Fi Protected Setup (WPS) in a portable terminal, the method comprising:
  entering a group owner mode of a Wi-Fi Peer-to-Peer (P2P) when enabling of a Wi-Fi Protected Setup (WPS) is requested;
  after entering the group owner mode, entering a first WPS session where the portable terminal is operable in a WPS registrar mode;
  determining whether an Access Point (AP) whose first WPS session of the WPS registrar mode is enabled or a device whose group owner mode is enabled, is discovered;
  when the AP whose WPS registrar mode is enabled or the device whose group owner mode is enabled is discovered, disabling the WPS registrar mode and the group owner mode, enabling a second WPS session where the portable terminal is to operate in a WPS enrollee mode, and accessing the discovered AP; and
  when the device whose group owner mode is enabled is discovered, determining the group owner of Wi-Fi P2P from among the portable terminal and the discovered device, and forming a Wi-Fi P2P group according to the determination results.

2. The method of claim 1, wherein the forming of the Wi-Fi P2P group comprises:
  when the device whose group owner mode is enabled is discovered, comparing a prefix of a Service Set Identifier (SSID) name of the portable terminal, which is generated in a group owner mode entry process, with a prefix of an SSID name of the discovered device; and
  forming the Wi-Fi P2P group according to the prefix comparison results.

3. The method of claim 2, wherein the forming of the Wi-Fi P2P group comprises acquiring group owner rights by the device corresponding to a prefix having a greater value among the prefix of the SSID name of the portable terminal and the prefix of the SSID name of the discovered device, and forming the Wi-Fi P2P group.

4. The method of claim 2, wherein the forming of the Wi-Fi P2P group comprises acquiring group owner rights by the device corresponding to a prefix having a lesser value among the prefix of the SSID name of the portable terminal and the prefix of the SSID name of the discovered device, and forming the Wi-Fi P2P group.

5. The method of claim 2, wherein the forming of the Wi-Fi P2P group comprises exchanging Probe Request and Probe Response messages of an Institute of Electrical and Electronics Engineers (IEEE) 802.11 Medium Access Control (MAC) protocol,
  wherein the Probe Request includes at least one of a P2P Information Element (IE), a Wi-Fi Simple Configuration (WSC) IE, and a Supplemental Registration (Supp Reg) IE, and wherein the Probe Response includes at least one of a P2P IE, a WSC IE, a Robust Security Network (RSN) IE, and a Supp Reg IE.

6. An apparatus for connecting a Wireless-Fidelity (Wi-Fi) using a Wi-Fi Protected Setup (WPS) in a portable terminal, the apparatus comprising:
  a Wi-Fi transceiver configured to provide a wireless communication function;
  a key input device or a display device configured to receive a key input from a user; and
  a controller:
  for entering a group owner mode of Wi-Fi Peer-to-Peer (P2P) when enabling of a Wi-Fi Protected Setup (WPS) is requested on the key input device or the display device,
  for entering a first WPS session where the portable terminal is operable in a WPS registrar mode,
  for determining whether an Access Point (AP) whose WPS first session of the WPS registrar mode is enabled or a device whose group owner mode is enabled, is discovered,
  when the AP whose WPS registrar mode is enabled or the device whose group owner mode is enabled is discovered, the controller disables the WPS registrar mode and the group owner mode, enables a second WPS session where the portable terminal is to operate in a WPS enrollee mode, and accesses the discovered AP, and
  when the device whose group owner mode is enabled is discovered, the controller determines the group owner of Wi-Fi P2P from among the portable terminal and the discovered device, and forms a Wi-Fi P2P group according to the determination results.

7. The apparatus of claim 6, wherein, when the device whose group owner mode is enabled is discovered, the controller is further configured:
- to compare a prefix of a Service Set Identifier (SSID) name of the portable terminal, which is generated in a group owner mode entry process, with a prefix of an SSID name of the discovered device, and
- to form the Wi-Fi P2P group according to the prefix comparison results.

8. The apparatus of claim 7, wherein the device corresponding to a prefix having a greater value among the prefix of the SSID name of the portable terminal and the prefix of the SSID name of the discovered device, acquires group owner rights and forms the Wi-Fi P2P group.

9. The apparatus of claim 7, wherein the device corresponding to a prefix having a lesser value among the prefix of the SSID name of the portable terminal and the prefix of the SSID name of the discovered device, acquires group owner rights and forms the Wi-Fi P2P group.

10. The apparatus of claim 7, wherein,. when the device whose group owner mode is enabled is discovered, the controller forms the Wi-Fi P2P group by exchanging Probe Request and Probe Response messages of an Institute of Electrical and Electronics Engineers (IEEE) 802.11 Medium Access Control (MAC) protocol,
- wherein the Probe Request includes at least one of a P2P Information Element (IE), a Wi-Fi Simple Configuration (WSC) IE, and a Supplemental Registration (Supp Reg) IE, and wherein the Probe Response includes at least one of a P2P IE, a WSC IE, a Robust Security Network (RSN) IE, and a Supp Reg IE.

* * * * *